June 19, 1923.
E. H. VINCENT
STEERING WHEEL
Filed Sept. 7, 1922
1,459,040
4 Sheets-Sheet 2
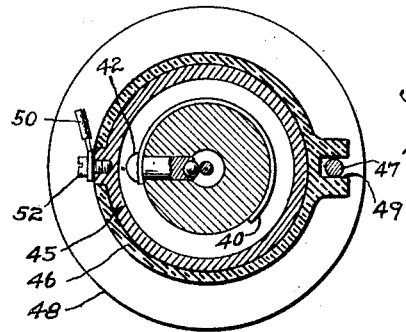
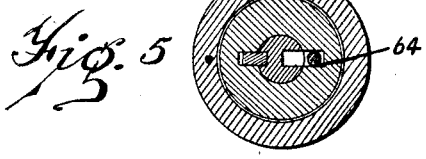
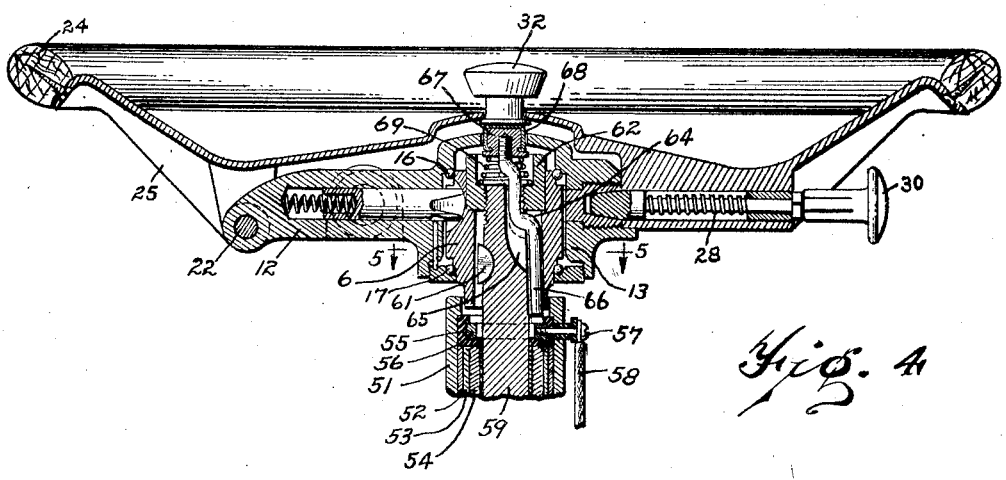
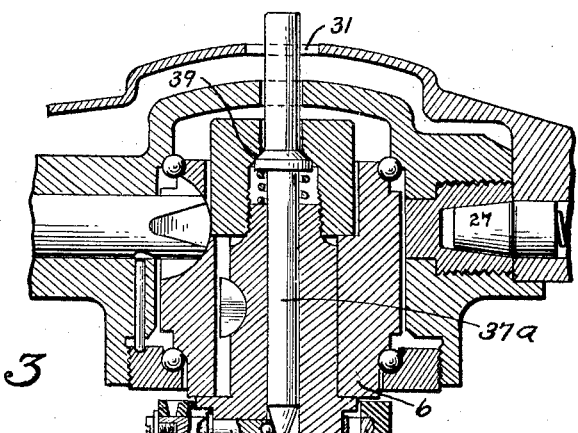
Inventor
Edward H. Vincent
By Edward N. Pagelsen
Attorney June 19, 1923.                                              1,459,040
                    E. H. VINCENT
                    STEERING WHEEL
                  Filed Sept. 7, 1922           4 Sheets-Sheet 3

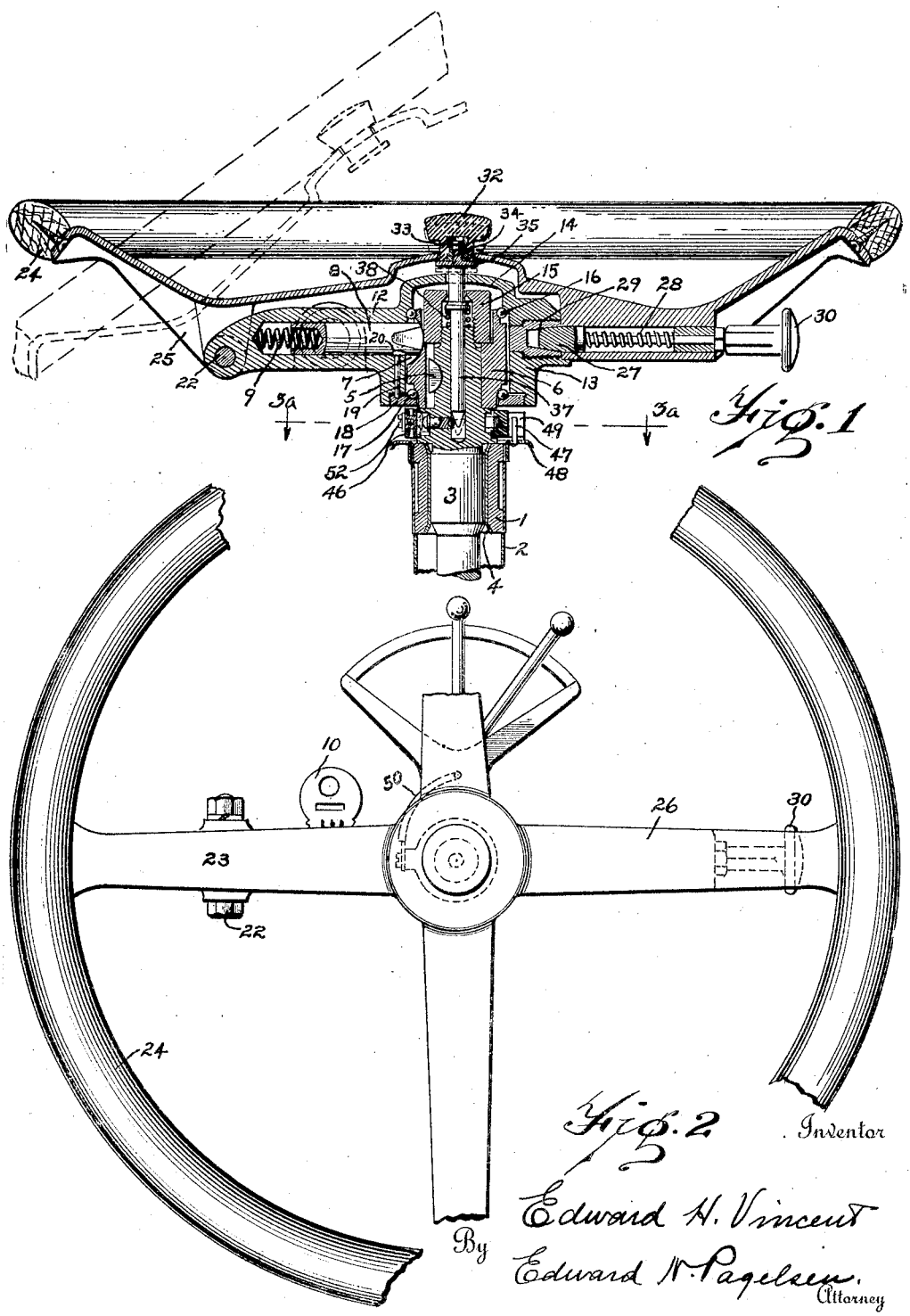

Inventor
Edward H. Vincent
By Edward N. Pagelsen
Attorney

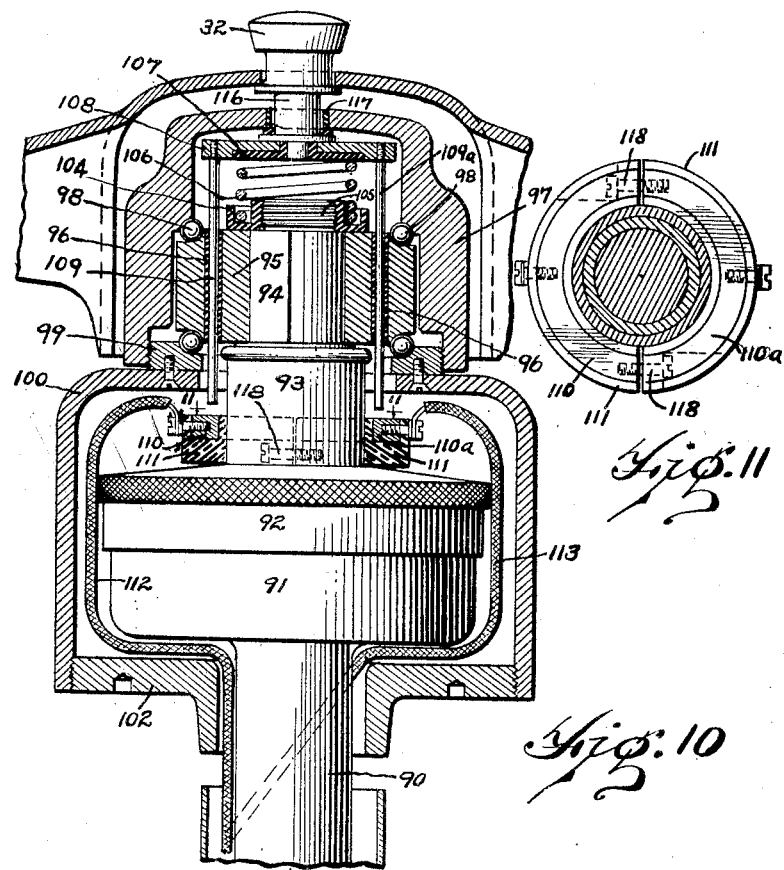
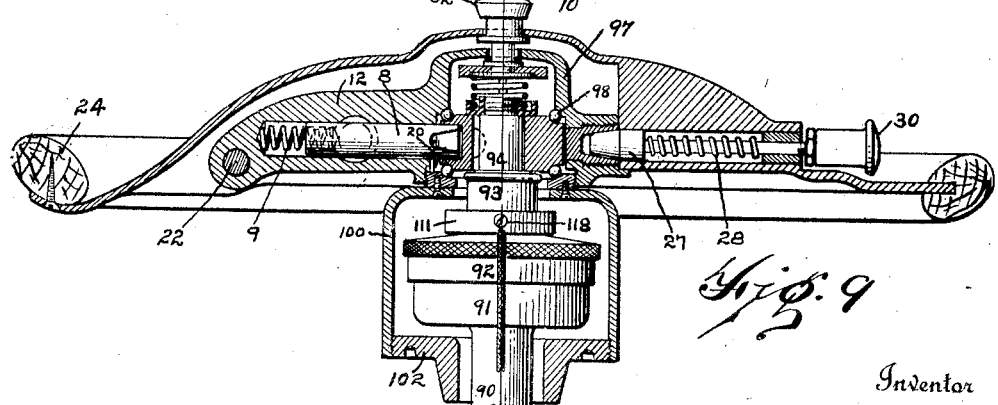

Patented June 19, 1923.

1,459,040

UNITED STATES PATENT OFFICE.

EDWARD H. VINCENT, OF DETROIT, MICHIGAN.

STEERING WHEEL.

Application filed September 7, 1922. Serial No. 586,688.

*To all whom it may concern:*

Be it known that I, EDWARD H. VINCENT, a citizen of the United States, and residing at Detroit, in the county of Wayne and State of Michigan, have invented a new and Improved Steering Wheel, of which the following is a specification.

This invention relates to steering wheels for automobiles, particularly to that type which embodies a hub portion adapted to be locked to and unlocked from the steering shaft of the vehicle, and a rim and spider portion pivoted on the hub portion, and its object is to provide a steering wheel of this character which shall be of great strength, which shall be simple in construction, and wherein the horn button shall be mounted on the spider and the electric contacts operated by the horn button shall be mounted within the hub and be enclosed thereby, the hub being preferably formed of hardened steel so that access to the electric connections therein is practically prevented.

Figure 8:
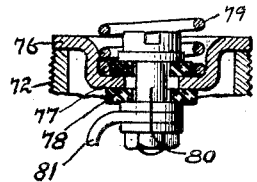
Figure 6:
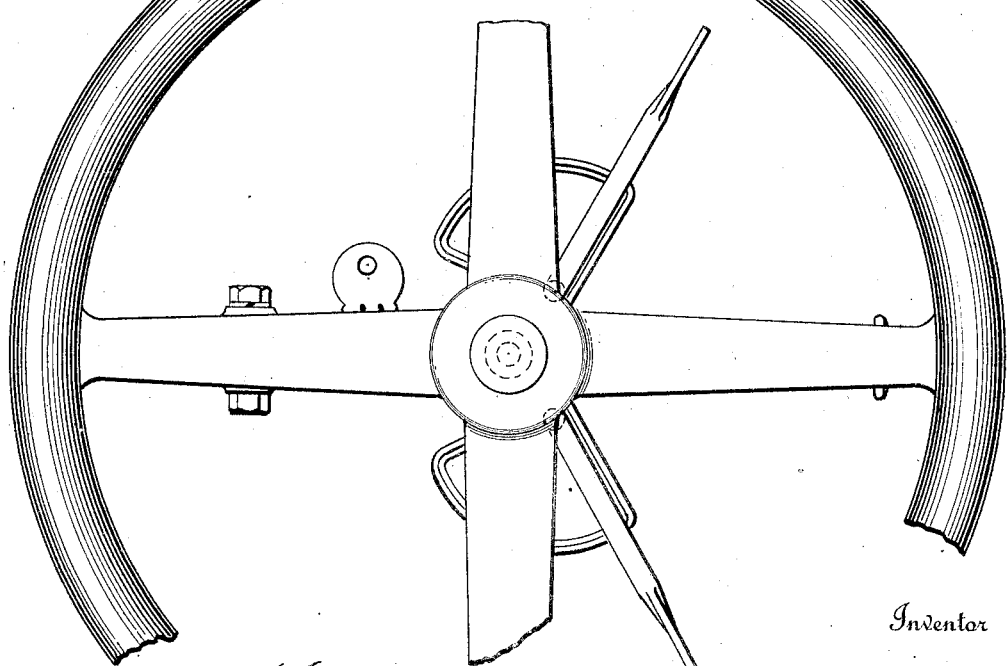

In the accompanying drawings, Fig. 1 is a vertical section of the steering wheel embodying this invention. Fig. 2 is a plan thereof. Fig. 3 is a vertical section of a steering wheel head which differs slightly from that shown in Fig. 1. Fig. 3ª is a section on the line 3ª—3ª of Fig. 1. Fig. 4 is a section similar to Fig. 1 of another modified form of steering wheel embodying this invention. Fig. 5 is a section on the line 5—5 of Fig. 4. Fig. 6 is a plan and Fig. 7 a vertical section of another modified form of steering wheel embodying this invention. Fig. 8 is a detail of the contacts on a larger scale. Fig. 9 is a vertical section of still another modified form of this invention. Fig. 10 is a section on the line 10—10 of Fig. 9 on a larger scale. Fig. 11 is a section on the line 11—11 of Fig. 10.

Similar reference characters refer to like parts throughout the several views.

A bushing 1 at the upper end of the tubular steering post 2 constitutes a bearing for the steering shaft 3, an anti-friction lining 4 being provided if desired. On this steering shaft and secured thereto by a key 5 is a hard steel head 6 which is formed with a notch 7 to receive the locking bolt 8. This locking bolt is normally held inward by means of a spring 9 but may be withdrawn by means of a key 10. The particular construction used to connect the lock which is controlled by this key 10 to the bolt 8 is not shown, as it forms no part of the present invention.

This bolt 8 and the lock which operates it are mounted in an arm 12 extending from the hard steel hub 13 of the steering wheel. This hub has a central cap portion 14 which extends over the nut 15 by means of which the head 6 is held in position on the shaft 3. Bearing balls 16 are positioned between recesses formed within the hub 13 and at the upper end of the head 6 and other bearing balls 17 are in recesses formed in the head 6 and in a hard steel nut 18 which screws up into the hub. This nut is normally prevented from turning by means of a pin 19 which extends into notches in this nut but which pin is permitted to move up and down by reason of the notch 20 in the locking bolt 8 when that locking bolt is in operative position. When, however, the locking bolt is withdrawn so that the wheel can spin freely on the head 6, then this notch is no longer over the pin 19 and the bolt therefore will prevent the nut 18 from being turned back to permit the removal of the steering wheel from the head 6.

The arm 12 carries a pin 22 on which one of the arms 23 of the spider of the steering wheel is mounted, the rim 24 connecting to the ends of the arms in the usual manner. This arm 23 is provided with sides 25 through which the pin 22 extends and which enclose the arm 12 on the hub except at that point where the key 10 is introduced, at which point the one side 25 has a notch. These details are not illustrated as they form no part of the present invention.

The arm 26 which is opposite the arm 23 carries a locking pin 27 normally held inwardly by a spring 28 to engage in the bushing 29 mounted in the hub 13. This pin can be withdrawn by means of the button 30 so as to permit the wheel rim and spider to be swung up to the position shown in dotted lines in Fig. 1. This spider is provided with a central opening into which the horn button 32 of insulating material extends, and molded in this horn button while it is being formed is an internally threaded sleeve 33 which receives the threaded extension 34 of a push button 35. When the wheel is swung up as shown in dotted lines, the horn button goes with it.

Slidably mounted in the upper end of the shaft 3 is a hard steel stem 37 which is normally held upward by means of a spring 38 against the horn button, as shown in Fig. 1. The construction of this device is more clearly shown in Fig. 3 where the stem 37ª is of sufficient length to extend up through the central hole 31 in the central part of the spider, the stem being formed with a shoulder 39 to limit its upward movement. Mounted in the lower end of the head 6 and normally held inward by the spring 40 is a contact pin 42 which may have a ball 43 mounted in its inner end to contact with the tapering end 44 of the stem 37ª. The pin 42 is forced out when the stem 37ª is depressed until this pin contacts with the contact ring 45 mounted in a collar 46 of insulating material, this collar being loosely mounted on the steering shaft 3 and being prevented from turning therewith by the pin 47 carried by the flange 48 at the upper end of the steering column, which pin extends between the lugs 49 on this collar to keep it from turning. The conductor wire 50 may be attached to the contact ring 45 by means of a screw 54 which extends into a boss 45ª on this ring. The steering wheel is grounded and as one side of the battery is grounded, depression of the stem 37ª will cause the pin 42 to complete a circuit between the wire 50 and the grounded steering mechanism.

In the construction shown in Fig. 4, the steering column 51 encloses usual tubes 52 and 53 by means of which the spark and throttle are controlled, the mechanism for this control being omitted as it forms no part of this invention. A collar 55 of insulating material is mounted in the upper end of the column 51 and carries a contact ring 56 of metal to which the screw 57 and the conductor wire 58 connect. This conductor wire 58 extends to the horn of the vehicle. The steering shaft 59 is again provided with a head 6 which is connected to the shaft by means of a key 61 and a nut 62. Bearing balls 16 and 17 support the hub 13 of the steering wheel, the hub having an arm 12 which carries a pin 22 on which the steering wheel is mounted as above described. The horn button 32 is again constructed as shown in Fig. 1.

The head 6 is formed with a recess 64 and the shaft is formed with a recess 65 in which a stem 66 is mounted. The upper end of this stem screws into a cylindrical button 67 around which is loosely mounted a hardened steel shroud 68. In Fig. 1, the stem 37 may rotate with or independently of the steering shaft 3, but in this construction the stem 66 turns with the head 6 and with the steering shaft 59. It is conceivable that a wedge could be driven in between the button 67 and the wall of the opening in the top 14 of the hub 13 and that thereby the steering shaft might be turned. By having this steel shroud 68 loose on the button 67, a wedge driven in between it and the edge of the opening would merely cause the shroud to turn without turning the button and the shaft. This button is normally held in its uppermost position by means of the spring 69 but can be depressed by means of the horn button 32 which causes the lower end of the stem 66 to engage with the contact ring 56 and thus close the circuit between the contact ring and the metal parts of the steering mechanism and thereby complete the circuit between the storage battery of the automobile and the horn.

Figure 7:
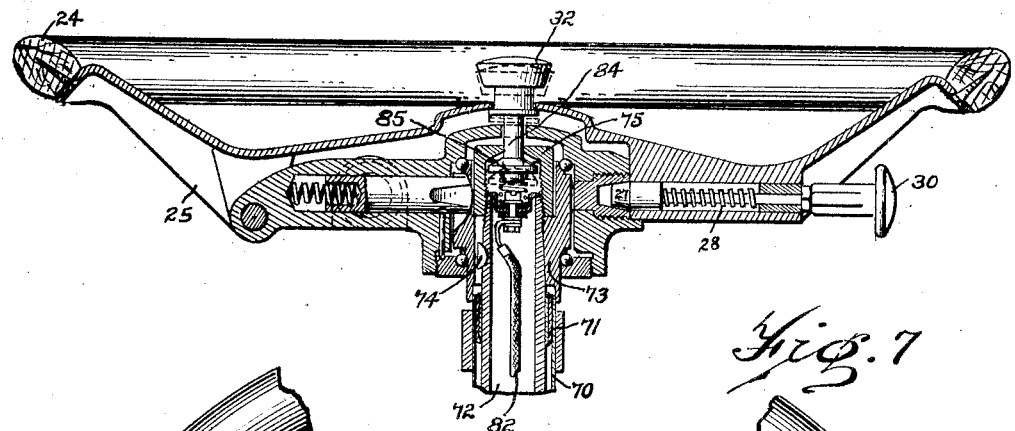

The steering mechanism shown in Figs. 6, 7 and 8 embodies a steering column 70 which is provided with a bushing 71 to constitute a bearing for the hollow steering shaft 72. This shaft is shown to be tapering at its upper end and to receive the head 73, which, in other respects, is similar to the head 6 shown in Fig. 1. This head 73 is secured on the shaft by means of a key 74 and a nut 75. The constructions of the steering wheel and the horn button 32 mounted thereon are the same as similar parts shown in Fig. 1 and the same reference characters are employed. Mounted on the top of the steering shaft 72, as indicated in Fig. 8, is a cup-shaped washer 76 which carries the washers 77 and 78 of insulating material, and the spring 79. The washers 77 and 78 are held in position by the bolt 80 which also carries the upper end 81 of a conductor 82 which extends to the horn. This bolt 80 and the upper end of the conductor 82 are therefore normally insulated from the steering mechanism. A hard steel stem 84 is slidable in the nut 75 and extends into engagement with the horn button while its lower end is formed with a flange 85 which contacts with the spring 79. When the horn button 32 is depressed, this flange 85 will contact with the head of the bolt 80 and thereby close a circuit between the horn button and the steering mechanism which acts as a ground for this electric circuit.

The embodiment of this invention shown in Figs. 9, 10 and 11 is particularly adapted for use on Ford automobiles. In this case, the steering column 90 supports the usual gear casing 91 provided with a cap 92 which has a neck 93 that constitutes a bearing for the stub shaft 94 which drives the central pinion of this gear mechanism. Secured to this shaft 94 is a head 95 in the form of a collar which has vertical holes in which the tubes 96 of insulating material are mounted. The hub 97 of the steering wheel is carried by the bearing balls 98, the lower set of which engage the nut 99 which screws up into this hub. A hardened steel cover 100 extends over and around the gear case and its lower end is closed by means of a hardened ring 102 which is tightly screwed into the lower end of the cover and thereby prevents access to the wires and contacts. As this cover 100 and its ring 102 are preferably of hardened steel, the contacts and wires are fully protected.

The spider of this steering wheel is again provided with a central opening in which the horn button 32 is mounted. A nut 104 screws onto the upper end 105 of the shaft 94 and carries a spring 106 which presses against the disk 107 of insulating material carried by the metal disk 108. The stems 109 and 109$^a$ extend down from this metal disk 108 and when the horn button is depressed they contact with the semi-circular contacts 110 and 110$^a$ which are mounted in the collar 111 of insulating material attached to the neck 93 of the cap 92 of the gear box. These semi-circular contacts 110 and 110$^a$ connect respectively with the conductors 112 and 113 which extend down around the steering column 90. This collar 111 is preferably in two parts which are secured to the neck 93 of the gear box cap by means of screws 118.

When the horn button 32, which is of insulating material, is depressed, current passes over the conductor 112, one semi-circular contact 110, stem 109, the disk 108 to the hardened plunger 116 thereon, but as this plunger 116 slides in an insulating sleeve 117, no current can pass to the hub 97 and be lost. As the horn button 32 is of insulating material, no current can pass to the spider. The current, therefore, passes down the other stem 109$^a$ to the semi-circular contact 110$^a$ and to the wire 113. One of these wires connects to the horn button and the other wire to the battery, the horn button and battery being connected by means of other conductors.

It will therefore be noted that in each one of these cases the steering wheel is pivoted on a hub and can be swung up to give more clearance at the steering column. The horn button 32 is mounted on the spider of the steering wheel and is lifted therewith. This button normally contacts with a member which is permanently positioned at the upper end of the steering shaft and which is accessible when the steering wheel is swung up so that the horn can be sounded at all times.

The details and proportions, however, of the various parts of this construction may all be changed by those skilled in the art without departing from the spirit of my invention as set forth in the following claims.

I claim:—

1. In a steering wheel, a shaft, a head mounted thereon, a wheel spider carried by the head, an operating button carried by the spider, and electrical contact elements mounted within said head and arranged to be actuated by said operating button.

2. In a steering wheel, a shaft, a head rotatably mounted thereon, a wheel spider carried by the head, an operating button carried by the spider, and electrical contact elements arranged to be actuated by said operating button irrespective of the position of the head in respect to said shaft.

3. In a steering wheel, a shaft, a head mounted thereon, a wheel spider adapted to be moved from operative to inoperative position on the head, a movable member carried by the wheel spider, and electrical contact elements arranged to be actuated by said movable member.

4. In a steering wheel, a shaft, a head mounted thereon, a wheel spider adapted to be moved from operative to inoperative position on the head, a movable member carried by the wheel spider, and electrical contact elements arranged to be actuated by said movable member when said spider is in operative position on the head.

5. In a steering wheel, a shaft, a head mounted thereon, a wheel spider adapted to be moved from operative to inoperative position on the head, a movable member carried by the wheel spider, electrical contact elements arranged to be actuated by said movable member when said spider is in operative position, and means to lock said spider in operative position on the head.

6. In a steering wheel, a shaft, a head mounted thereon, a wheel spider adapted to be tilted from operative to inoperative position on the head, a movable member carried by the wheel spider, and electrical contact elements arranged to be actuated by said movable member.

7. In a steering wheel, a shaft, a wheel spider movably mounted on said shaft, a movable member carried by the wheel spider, and electrical contact members carried by the shaft and arranged to be operated by said movable member carried by the spider.

8. In a steering wheel, a shaft, a wheel spider rotatably mounted on said shaft, a movable member carried by the wheel spider, and electrical contact members carried by the shaft and arranged to be operated by said movable member.

9. In a steering wheel, a shaft, a bushing attached thereto, a head mounted on and adapted to cover the bushing, and electrical contact members carried by the shaft, said head having an opening through which one of the contact members extends, said bushing encompassing one of said contact members.

10. In a steering wheel, a shaft, a hollow bushing rigidly attached thereto, a head rotatably mounted on and adapted to cover the bushing, and electrical contact members carried by the shaft within the bushing, said head having an opening through which one of the contact members is movable.

11. In a steering wheel, a shaft, an electric contact attached to said shaft and insulated therefrom, a steering head mounted on the shaft, a wheel spider mounted on the head, a manually movable contact member projecting from said head through an opening therein and adapted to be moved to engage the contact on the shaft, and a spring to normally hold the contacts out of engagement.

12. In a steering wheel, a shaft, an electric contact mounted thereon, a steering head mounted on the shaft, a wheel spider mounted on the head, and a manually movable contact member projecting from said head through an opening in which said contact member is freely rotatable.

13. In a steering wheel, a steering shaft, a bushing thereon, a hollow nut to secure the bushing on the shaft, a head rotatably mounted on said bushing, a wheel spider movably mounted on and adapted to cover the head, electrical contact members, one of said contact members being movable in said nut and adapted to extend through an opening in the head.

14. In a steering wheel, a steering shaft, a bushing thereon, a hollow nut to secure the bushing on the shaft, a wheel hub rotatably mounted on said bushing, electrical contact members, one of said contact members being manually movable and projecting into said nut and adapted to extend through an opening in the hub, and a spring to project said contact member.

15. In a steering wheel embodying a spider, a steering shaft, electric contacts, manually movable means for operating said contacts, said spider adapted to overlie said contacts and having an opening through which said means is operable.

16. In a steering wheel embodying a wheel head and a spider, a steering shaft, electric contacts, manually movable means for operating said contacts, said spider having an opening and being movable on the head from operative to inoperative position, said means being accessible through said opening when the spider is in operative position.

17. In a steering wheel embodying a wheel head and a spider, a steering shaft carrying said head, a pair of electric contacts adjacent the upper end of said shaft, manually operable means for connecting said contacts, said spider being tiltably mounted on said head and having an opening through which said means is operable.

18. In a steering wheel embodying a wheel head and a spider, a steering shaft carrying said wheel head, electric contacts normally out of engagement adjacent the upper end of said shaft, one of said contacts being movable to engage the other contact, said spider overlying and having an opening above the contacts through which the movable contact member is operable, said spider adapted to be moved to inoperative position on the head, and means to secure the spider in operative position.

19. In a steering wheel, a shaft, a wheel head mounted thereon, a wheel spider movable to operative or inoperative positions on said wheel head, movable means carried by said spider, and electric contact elements mounted in said head and arranged to be operated by said movable means when said spider is in operative position, said electric contact elements also being operable independent of said movable means when said spider is in inoperative position.

20. In a steering wheel, a shaft, a head mounted thereon, a wheel spider mounted on and adapted to cover the head, and electric contact members mounted within said head, one of the members extending through and being movable in an opening in the head.

21. In a steering wheel, a shaft, a wheel head mounted thereon, a wheel spider movable to operative or inoperative positions on said wheel head, movable means carried by said spider, and electric contact elements arranged to be operated by said movable means when said spider is in operative position, said electric contact elements also being operable independent of said movable means when said spider is in inoperative position.

EDWARD H. VINCENT.